US 6,603,965 B1

(12) United States Patent
Dinkin

(10) Patent No.: US 6,603,965 B1
(45) Date of Patent: Aug. 5, 2003

(54) PERVASIVE VOICE HANDSET SYSTEM

(75) Inventor: Sam Dinkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,307

(22) Filed: May 11, 2000

(51) Int. Cl.[7] .......................... H04L 12/66; H04M 3/42; H04Q 7/20; H04B 1/38
(52) U.S. Cl. ...................... 455/416; 455/417; 455/557; 455/414; 455/575; 455/74.1; 455/519; 370/294; 370/524; 370/261; 379/119; 379/203; 379/204; 379/207; 379/242
(58) Field of Search ................................ 455/416, 417, 455/519, 445, 414, 422, 433, 560, 439, 74.1, 557, 575; 379/112, 203, 204, 207, 242, 230, 93.14; 370/264, 524, 261, 294

(56) References Cited

U.S. PATENT DOCUMENTS

| | | | | |
|---|---|---|---|---|
| 4,972,457 A | * | 11/1990 | O'Sullivan | 455/556 |
| 4,991,197 A | * | 2/1991 | Morris | 455/557 |
| 5,025,373 A | * | 6/1991 | Keyser et al. | 235/379 |
| 5,428,671 A | * | 6/1995 | Dykes et al. | 379/93.32 |
| 5,477,418 A | * | 12/1995 | MacGregor et al. | 361/737 |
| 5,513,184 A | * | 4/1996 | Vannucci | 331/25 |
| 5,566,226 A | * | 10/1996 | Mizoguchi et al. | 455/558 |
| 5,583,925 A | * | 12/1996 | Bernstein | 379/202.01 |
| 5,894,479 A | * | 4/1999 | Mohammed | 370/401 |
| 6,112,103 A | * | 8/2000 | Puthuff | 455/557 |
| 6,157,620 A | * | 12/2000 | Danne et al. | 370/294 |
| 6,157,846 A | * | 12/2000 | Manning et al. | 379/93.01 |
| 6,163,692 A | * | 12/2000 | Chakrabarti et al. | 370/261 |
| 6,208,727 B1 | * | 3/2001 | Ganpaul et al. | 379/102.06 |
| 6,281,785 B1 | * | 8/2001 | Hamaguchi | 340/407.1 |
| 6,295,460 B1 | * | 9/2001 | Nagel et al. | 379/93.28 |
| 2001/0006893 A1 | * | 7/2001 | Kenji | 455/435 |
| 2002/0021690 A1 | * | 2/2002 | Preiss et al. | 370/352 |
| 2002/0106994 A1 | * | 8/2002 | Payne et al. | 455/74.1 |

FOREIGN PATENT DOCUMENTS

| | | |
|---|---|---|
| EP | 0 896 495 A2 | 2/1999 |
| EP | 0 896 495 A3 | 11/1999 |
| GB | 2 360 175 A | 9/2001 |

OTHER PUBLICATIONS

United Kingdom Search Report dated Nov. 29, 2001.

* cited by examiner

*Primary Examiner*—Vivian Chin
*Assistant Examiner*—Kamran Afshar
(74) *Attorney, Agent, or Firm*—Stephen C. Kaufman, Esq.; McGinn & Gibb, PLLC

(57) ABSTRACT

A system (and method) for linking wireless and land line communications media, includes a connector for connecting a communications media, and an indicator for alerting a user of the state of a connection. The connector automatically initiates a continuous reestablishment operation after the indicator announces a state of disconnection and in which the system provides a conferencing capability using the Internet. A handset to be used in voice communications includes a housing including a receiver and transmitter for connecting to a computer network, a plurality of wireless protocols for use with the transmitter, and a universal telephone port coupled to the housing for connecting to a universal telephone jack.

22 Claims, 3 Drawing Sheets

PERVASIVE VOICE HANDSET SYSTEM

BACKGROUND OF THE INVENTION

1. Field of the Invention

The present invention relates to mobile telephone communications, and more specifically, to mobile voice communications for improving communications using conferencing, Internet, and cellular technology and for recognizing when a party to a call has been disconnected.

2. Description of the Related Art

During mobile voice communications, various problems and difficulties may occur which can interrupt or delay communication. For example, in cellular ("cell") phone services, cell phone coverage and service delivery may be intermittent and varied due to the large number of cellular telephone companies providing service.

Further, air-time charges are expensive, and at times it is difficult to hear certain cell phone callers. Moreover, many cellular telephone handsets do not feature headset jacks, thereby making some communications inconvenient.

Moreover, cellular phone coverage is nonexistent inside many office buildings and cell phone service is often interrupted during calls due to building obstructions, terrain, etc. Cell phone drop-offs (or faulty "hand-offs") are annoying, particularly because parties may not be notified of a failing connection. When a connection is broken, time is required to reestablish the flow of conversation because the party talking is unaware at which instant the signal failed.

Reestablishing a phone connection can also be awkward. Telephones typically remain busy for some period after a call fails (e.g., the parties typically remain on the line hoping the service interruption ends and it is unclear as to who (e.g., calling party or called party) should be actively reestablishing the connection). Moreover, there is a likelihood that reluctant participants to a mobile telephone call are unavailable for further communication in the event a calling connection fails.

With regard to Internet phones, the phone service does not normally ring (e.g., activate an audio alarm), and therefore the Internet telephone requires the establishment of an appointed time for communicating.

Furthermore, Internet phone service is jittery because of the inherent nature of a loaded packet switched network and, as a result, the phone service is unreliable. Internet phone service also can be interrupted during a call and reestablishment is unwieldy because of busy signals and a lack of established etiquette.

A further difficulty arises with the modem being used, as business people often have many different phone lines with different numbers, making it difficult to remember and select the correct number.

Further, in regards to land-line phone service, voice terminals are often incompatible and without a call-waiting feature, must be off in order to ring.

The above problems are exacerbated in a conferencing environment where there are a plurality of participants, and frustration arises and time is wasted when a conferencing operation fails and faulty reestablishment of the connections occur. Further, conventional systems involve high costs and offer no backup connections.

SUMMARY OF THE INVENTION

In view of the foregoing and other problems, disadvantages, and drawbacks of the conventional methods and structures, an object of the present invention is to provide a method and structure in which existing wireless (e.g., Internet and cellular technologies) and land-line service connections can more easily and reliably be linked in a conference call.

A further object of the invention is to provide a system for improving the availability and reliability of mobile voice service using cellular, conferencing, and Internet technologies. The object is to allow for a smooth transition to an environment where phones are replaced by voice-activated Internet-based solutions.

In a first aspect of the present invention, a system for linking wireless and land line communications media includes means for connecting a communications medium to a second communications medium and means for alerting a user of the state of a connection.

With the present invention, a mobile voice communication system is configured so that persistent, polite (e.g., electronic voice messaging, such as, "I'm sorry, Mr. X has temporarily dropped off the call. Let me try to reestablish it.") phone calls become available with a much richer tradeoff space for cost and quality, and much higher maximum quality.

The invention recognizes that some Internet Service Providers (ISPs) are more loaded than other, and that some ISPs have fewer hops to the destination than others. Thus, preferably, the invention uses multiple ISPs to improve Internet telephone service, providing a smooth path (e.g., a path with a low chance of failure and low jitter because it is less loaded and needs fewer hops to the destination) while using voice over Internet Protocol (IP) with improved quality of service guaranteed during transition (e.g., voice from land-to-Internet and wireless (cellular)-to-Internet, similarly to a cellular phone handoff) enabling substitution of wireless bandwidth and land-line circuits.

The invention preferably uses a handset with a 10BaseT (e.g., currently standard for computer phone calls in a work environment), Ethernet® port via Dynamic Host Communication Protocol (DHCP), various wireless protocols (e.g., such as those for various cordless telephones, GSM, CDMA 1900 MHZ 3G, blue tooth, radio, sonar, laser, optical, etc.), and a universal telephone port to connect to an audio conference room. Diverse cost structures (e.g., from zero connect charges to several simultaneous wireless/satellite sessions) and service levels are supported by the present invention.

According to an exemplary embodiment of the present invention, when a communication link is broken, a new link is initiated. The connected party remains connected to a persistent "virtual" conference room while the severed communication link gets reestablished. Preferably, the connected party is connected to the "conference room" via more than one link so that one link acts as a primary and another link acts as a secondary/standby link. Thus, with the invention, existing wireless and land line connections can participate in a conference including multiple cellular phones using different protocols.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
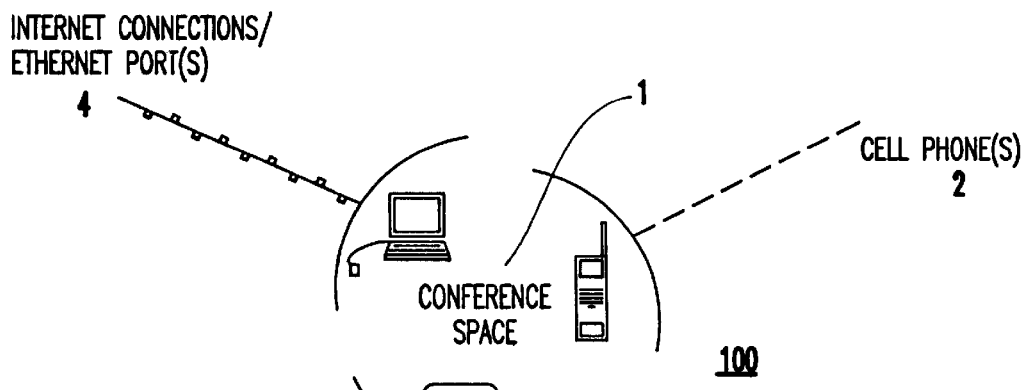
FIG. 1 shows an overview of a conference space accessed by various media.

Referring now to the drawings, and more particularly to FIGS. 1–6, there is shown a preferred embodiment of the method and structure according to the present invention.

Before examining the structure and operation of the present invention in detail, the general environment of the invention and its benefits will be described.

Briefly, during calls, an audio conference space (e.g., virtual conference space) 1 persists even if one of the callers is temporarily dropped. This allows the call to be reestablished without a busy signal being generated because non-dropped parties remain connected and any busy signal is muted. When a caller drops off, a sound is chimed indicating which caller has dropped off. The chime signals to the other participants that someone has dropped off the call. This allows the group involved in a conference to know where in the conversation the interruption took place and to be able to restart the conversation at the appropriate place when the connection is reestablished. The invention is not limited to a chime. For instance, in a two-party call, a robotic announcement can be made.

In FIG. 1, an overview of conferencing system 100 is shown in which many different types of voice communication links are established in a virtual conference space 1. The system includes links for cellular phone connections 2, land lines 3, and communications via the Internet/Ethernet 4 and various wireless protocols.

Multiple cell phones 2 can be used to call into the conference space 1 by a single participant so that if one is dropped off, the other(s) remains connected on the call. This will overcome "spotty" coverage and the problem of drop-offs.

In the system shown in FIG. 1, the audio conference space 1 persists even if one of the callers is temporarily dropped. Thus, the calling party that was dropped can reestablish a connection without a busy signal being generated.

This is achieved because the old link can persist even as a new link is established for the dropped party. The old link does not get dropped for the non-dropped party in the new system. "Polite" reestablishment can be performed via tailored software and standard hardware, each of which would be well within the grasp of one of ordinary skill in the art taking the present application as a whole.

In the system 100, when a caller drops off, a distinctive sound (e.g., chime, coded sounds, buzzing, and/or a predetermined number of beeps to identify a caller, etc., as set up in the system software) is generated indicating which caller has dropped off by the CPU hosting the call. A different chime may be associated with each individual caller, depending upon the order of the calls, so that, for example, a first calling party would have a deeper tone than a later calling party or vice versa.

The chime (or other alarm species) signals to the other participants that someone has dropped off the call. This allows the group involved in a conference to know where the interruption took place (e.g., based on the distinctive chime associated with a particular party) and to be able to restart the conversation when the connection is reestablished.

Figure 2:
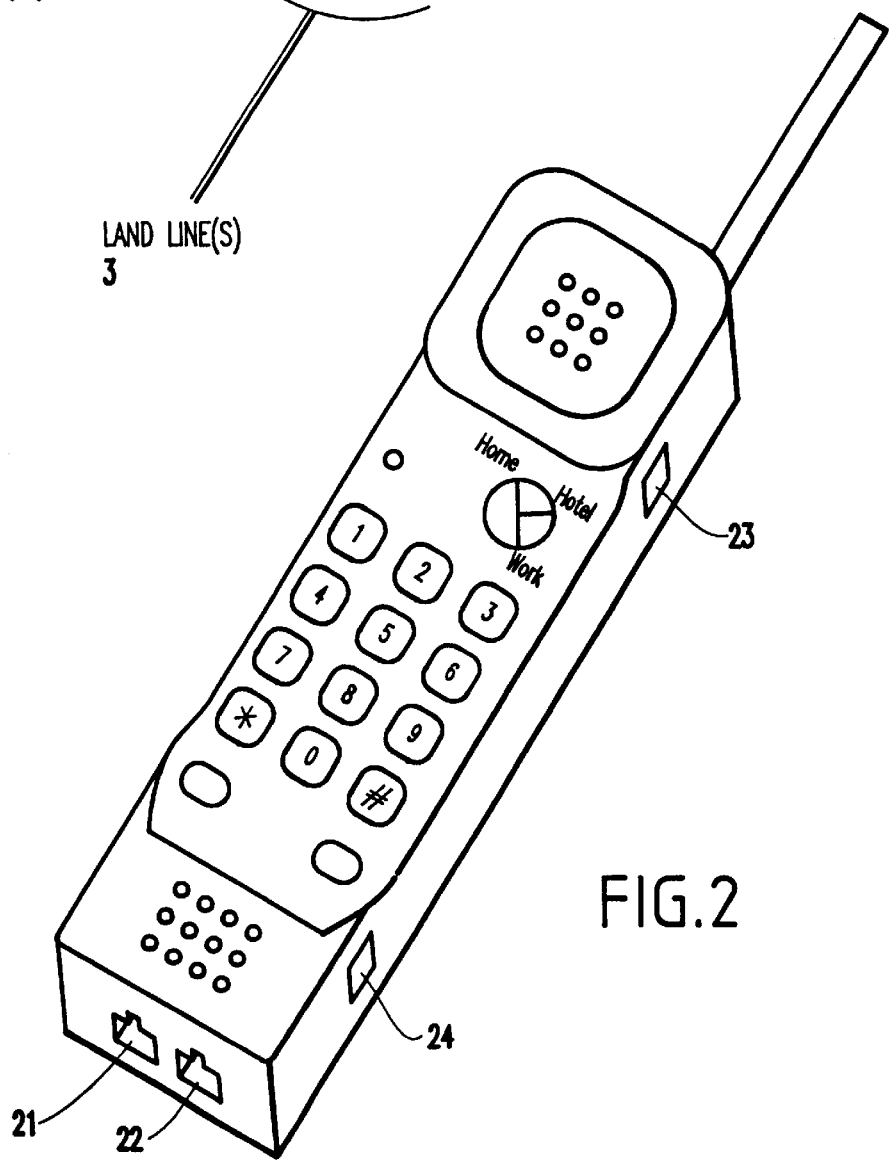
FIG. 2 is a schematic drawing of a handset for use with the preferred embodiment of the present invention.

As shown in FIG. 2, the present invention provides a wireless handset 20, having a universal telephone port 21 for a standard land line. The handset may feature an optional retractable cord 24 for use in land line connections.

The handset may also have a 10BaseT Ethernet port 22. Moreover, duplicate ports may be provided to support the use of standard land line or Ethernet terminals concurrently, or to pass through the connection when the handset is not in use.

In this embodiment, intuitive controls can be used to change the handset's land line and network settings to preset numbers (e.g., "9" to dial out at the office, "8" at a hotel, no number required for an outside line at home, fixed IP at work, and DHCP over cable modem through a "fire wall" at home). Further, a spinner 25 may be provided to dial preset numbers automatically by turning the spinner to the appropriate location designation (e.g., home, hotel, work, etc.).

Figure 3:
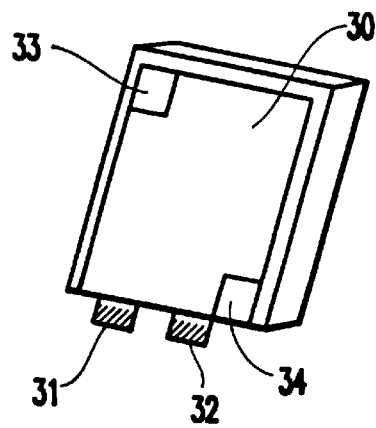
FIG. 3 is a schematic drawing of a touch screen device with multiple input connection terminals for use with the preferred embodiment of the present invention.

In another aspect of the invention, a "handset" can be a touch screen device 30 with a network card and a voice modem, as shown in FIG. 3. Such a touch screen device may have a universal telephone port 31 and a 10BaseT Ethernet port 32 similar to the handset in FIG. 2 and include an audio out section 33 and a microphone for voice communication. Standard handsets for voice or cellular could also be used. If in a hotel, legacy protocols such as robotic voice and advanced voice recognition can be used to connect to the system.

Other network protocols and ports can be supported such as token rings, Infrared (IR), wireless Local Area Network (LAN), etc. can be supported with minimal change. Similarly, third generation cellular (3G) standards can be added with little modification, including new RF hardware and software compliant with the 3G standards.

Figure 4:
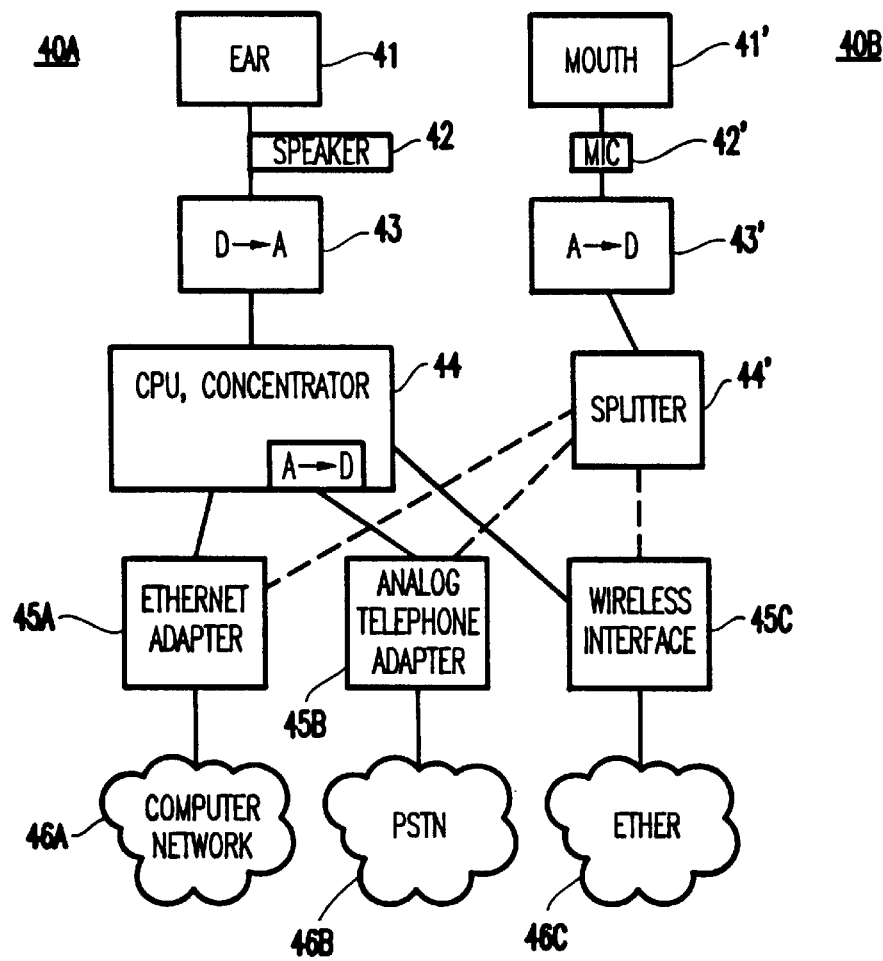
FIG. 4 is a block diagram showing a receiving signal path 40A and a sending signal path 40B in a preferred embodiment of the invention.

FIG. 4 is a block diagram showing a receiving signal path 40A and a sending signal path 40B in a preferred embodiment of the invention. The elements of the receiving signal path 40A include ear 41, speaker 42, digital-to-analog (D/A) converter 43, CPU 44 including a concentrator and analog-to-digital converter (unreferenced), and an adaptor/interface 45A–45C coupled to a computer network 46A, a PSTN 46B, and/or an Ethernet connection 46C. The elements of the sending signal path 40B include the user's mouth 41', a microphone (MIC) 42', analog-to-digital converter 43', a splitter 44' and the adaptor/interface 45A–45C coupled to a computer network 46A, a PSTN 46B, and/or an Ethernet connection 46C.

Figure 5:
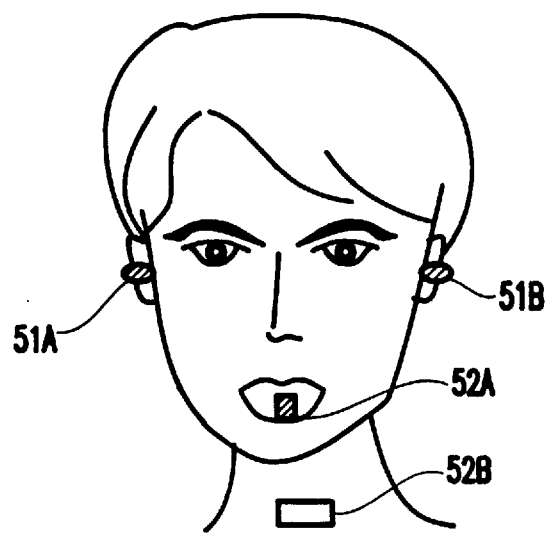
FIG. 5 is an illustration of a user with multiple cell phone inputs and outputs.

Referring to FIG. 5, a plurality of cell phones can also be used at the same time by a same caller (e.g., one over each ear), with inputs shown at 51A, 51B, and outputs shown at 52A, 52B. This concept of the present invention can also be mused to improve the persistence and reestablishment of Internet calls by using, for example, analog cell technology on one phone and PCS technology on the other.

Alternatively, two simultaneous connections can be established for a single device. The audio conference room also enables multiple connections over the Internet.

If the recipient's cell phone is out of range as determined by a signal received by the system server, it may be problematic to initiate a call. In such an instance, a handset having access to an Ethernet port can register, via DHCP for example, and transmit the IP number to a cell phone service provider and receive Internet phone calls while out of cell phone range. A conventional, commercially-available software package (e.g., phonefree.com; net meeting; net2phone; etc.) may be purchased allowing the handset to ring. Alternatively, the existing technology software can be used on another Internet voice terminal.

Additionally, a caller may have difficulty navigating a hotel phone extension or an unfamiliar office phone extension, or the user's land line number may be experiencing a problem receiving calls. In such cases, it may be easier to establish a persistent low bandwidth connection via the Internet 4 and initiate an outgoing call to the audio conference room on the land line 3 when a call is pending.

This alternative embodiment provides a high quality solution for incoming cell phone calls and also overcomes the incompatibility problem of land line terminals. Additionally, it allows a land line to remain active for other calls unlike a persistent audio conference.

Figure 6:
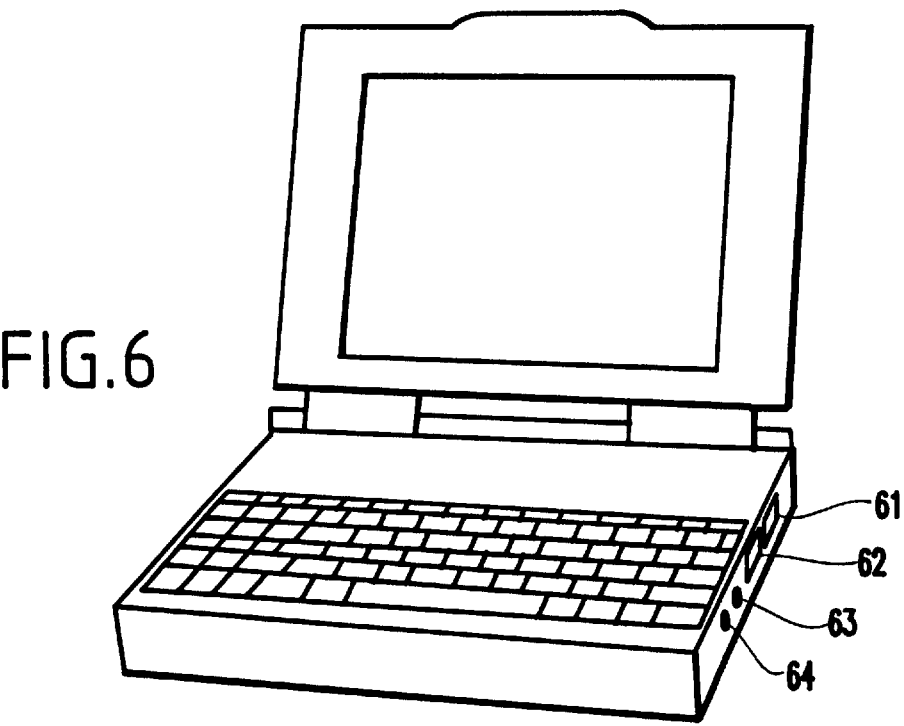
FIG. 6 is an illustration of a portable personal computer with a teleconferencing capability.

Referring to FIG. 6, a communication device can be a standard portable personal computer with a voice modem, a mono audio in jack 62, a stereo out jack 63, and ports for an analog communication device 61, or, alternatively, other devices 62 (e.g., Ethernet port).

It is noted that on the system server side, standard audio conferencing software will handle the bulk of the overhead. Custom redialing software can be added with automatic "politeness" features. Further, timers and recorded messages can be added to close a call after a waiting period if a connection was dropped. Further, the invention can be interfaced such that dynamic real time prices can be broadcast on a carrier channel (e.g., similar to conventional call-ins to a conference call in which each participant pays their own air time).

Thus, with the unique and unobvious features of the invention, during calls, an audio conference space 1 persists even if one of the callers is temporarily dropped. As a result, the call can be reestablished without busy signals. Further, the identity of the caller dropped off can be easily established by the other parties to the call since a predetermined sound, uniquely associated with each caller, has been established in advance.

Thus, the caller dropped off can be easily established, and the sound clearly indicates to the other participants that someone has dropped off the call, so that the parties involved in a conference know precisely where the interruption took place and be able to restart the conversation when the connection is reestablished.

With multiple connection options available at various dynamic quality levels, it is possible to trade off cost and quality. If a handset can potentially connect to an audio conference via land line, Internet and multiple wireless protocols, dynamic tradeoffs of cost versus quality can occur. This can lead to selecting high quality transmissions/receptions during important calls and low quality transmissions/receptions when economy is desired (e.g., a long distance call is dialed whenever the Internet becomes jittery or cellular begins to experience static). This can be combined into an integrated communications solution with one common number to dial for land line, wireless or Internet media.

The whole system enables a smooth transition to voice over IP. Further, it conserves the resource of wireless bandwidth or land line connections when pricing is favorable.

Additionally, a method of linking periodically connected communication devices is provided as discussed above, and such a method can be stored on a medium (optical, magnetic, etc.) as a series of program steps executable by a digital data processing system (e.g., CPU 44).

While the invention has been described in terms of a preferred embodiment, those skilled in the art will recognize that the invention can be practiced with modification within the spirit and scope of the appended claims.

What is claimed is:

1. A system for linking periodically connected communications devices, comprising:

a connector for connecting a communications medium to a second continually connected communications medium; and an indicator unit for determining the state of a connection, wherein said connector automatically initiates a continuous reestablishment operation after said indicator unit announces a state of disconnection, and wherein with a plurality of users in common communication, said indicator unit comprises a distinctive signal associated with each of said users such that users are alerted to which of said users have been dropped from a communication.

2. The system as claimed in claim 1, wherein said communications medium and said second communications medium include at least one of a land line network, a cellular telephone network, an Internet protocol network, a satellite telephone network, a blue tooth network, a radio network, an optical network, and a sonar network.

3. The system as claimed in claim 1, wherein said connector maintains a communications link when one of a plurality of users is disconnected.

4. The system as claimed in claim 1, wherein said distinctive signal comprises a distinctive sound associated with each of said users, wherein said indicator unit indicates a time of dropping of said user.

5. The system as claimed in claim 1, wherein at least two users are connected via one of an Internet connection, a wireless device and a computer network connection, a wireless and a wired communication line, and a wired communication line and a computer network connection.

6. The system as claimed in claim 1, wherein said communications persist even if one of a plurality of parties to the communication is temporarily disconnected.

7. The system as claimed in claim 1, wherein said reestablishment operation is performed automatically without any user input.

8. The system as claimed in claim 1, further comprising means for automatic three-way calling to a single party.

9. A system for linking periodically connected communications devices, comprising:

means for connecting a communications medium to a second continually connected communications medium; and means for determining the state of a connection, wherein said means for connecting automatically initiates a continuous reestablishment operation after said means for determining announces a state of disconnection, and wherein with a plurality of users in common communication, said determining means comprises a distinctive signal associated with each of said users such that users are alerted to which of said users have been dropped from a communication.

10. The system as claimed in claim 9, further comprising means for automatic three-way calling to a single party.

11. The system as claimed in claim 9, further comprising means for reestablishing a redundant link.

12. The system as claimed in claim 9, further comprising means for establishing a multi-protocol three-way call.

13. A handset for use in voice communications, comprising:
   a housing including a receiver and an alarm;
   at least two of a transmitter coupled to said housing for connecting to a computer network;
   at least two of a plurality of wireless protocols for use with said transmitter; and
   at least two of a universal telephone port coupled to said housing for connecting to a universal telephone jack,
   wherein said alarm notifies a user of a party disconnected from a communication channel and a time of said disconnection.

14. The handset according to claim 13, wherein said computer network comprises a Dynamic Host Communication Protocol over Ethernet.

15. The handset according to claim 13, further comprising means for receiving Internet communications.

16. The handset according to claim 13, further comprising an alarm for notifying a user of an incoming communication.

17. The handset according to claim 13, wherein said transmitter is programmed with at least one pre-set dialing number.

18. The handset according to claim 13, wherein one of a wireless and Ethernet, analog and wireless, wireless and wireless, wireless and Ethernet and analog, voice over Internet protocol and voice over Internet protocol, is used.

19. The handset of claim 13, wherein said handset comprises a cellular telephone capable of send-only communication.

20. The handset of claim 13, wherein said handset comprises a cellular telephone capable of receive-only communication.

21. A method for linking periodically connected communications devices, comprising:
   connecting a communications medium to a second continually connected communications medium;
   determining the state of a connection; and
   automatically initiating a continuous reestablishment operation after a state of disconnection has been determined,
   wherein with a plurality of users in common communication, said determining comprises providing a distinctive signal associated with each of said users such that users are alerted to which of said users have been dropped from a communication.

22. A signal-bearing medium tangibly embodying a program of machine readable instructions executable by a digital precessing apparatus to perform a method for linking periodically connected communications devices, said method comprising:
   connecting a communications medium to a second continually connected communications medium;
   determining the state of a connection; and
   automatically initiating a continuous reestablishment operation after a state of disconnection has been determined,
   wherein with a plurality of users in common communication, said determining comprises providing a distinctive signal associated with each of said users such that users are alerted to which of said users have been dropped from a communication.

\* \* \* \* \*